United States Patent
Olave et al.

(10) Patent No.: US 9,508,100 B2
(45) Date of Patent: Nov. 29, 2016

(54) METHODS AND APPARATUS FOR ON-LINE ANALYSIS OF FINANCIAL ACCOUNTING DATA

(75) Inventors: Andres Rodolfo Olave, London (GB); Rupert David George Parson, London (GB)

(73) Assignee: VALIDIS HOLDINGS LIMITED, St. Helier (JE)

( * ) Notice: Subject to any disclaimer, the term of this patent is extended or adjusted under 35 U.S.C. 154(b) by 561 days.

(21) Appl. No.: 13/113,518

(22) Filed: May 23, 2011

(65) Prior Publication Data

US 2012/0303494 A1     Nov. 29, 2012

(51) Int. Cl.
    *G06Q 40/02*     (2012.01)
    *G06F 17/30*     (2006.01)

(52) U.S. Cl.
    CPC ......... *G06Q 40/02* (2013.01); *G06F 17/30734* (2013.01)

(58) Field of Classification Search
    CPC ........................ G06Q 40/02; G06Q 17/30734
    See application file for complete search history.

(56) References Cited

U.S. PATENT DOCUMENTS

| | | | |
|---|---|---|---|
| 6,850,643 B1 | 2/2005 | Smith, II | |
| 6,850,908 B1 | 2/2005 | Smith, II | |
| 7,003,489 B1 | 2/2006 | Dixon, III | |
| 2005/0049954 A1* | 3/2005 | Graham et al. | 705/36 |
| 2005/0154328 A1 | 7/2005 | Thierman | |
| 2005/0154769 A1 | 7/2005 | Eckart | |
| 2005/0240467 A1 | 10/2005 | Eckart | |
| 2007/0150385 A1* | 6/2007 | Ode | 705/30 |
| 2010/0205076 A1 | 8/2010 | Shultz | |

FOREIGN PATENT DOCUMENTS

WO    WO-2008/099142 A1 *   8/2008    ......... G06Q 40/00

* cited by examiner

*Primary Examiner* — Hajime Rojas
(74) *Attorney, Agent, or Firm* — Conley Rose, P.C.

(57) ABSTRACT

There is discloses an on-line method of analysing financial accounting data, a server and a computer program. Certain embodiments of the method comprise receiving at a server uploaded financial accounting data from a client computer which includes a set of accounts A organized into account groups G. The financial accounting data is mapped to an accounting ontology stored at the server comprising at least a pre-defined set of primary category tags C and a pre-defined set of base level tags B each associated with a primary category tag C. The accounts are mapped according to mapping account groups G to primary category tags C and mapping accounts A to base level tags B, wherein each base level tag B has an associated set of criteria K. The mapped data is then analysed at the server. The results may be authorized to be shared with interested third parties.

22 Claims, 7 Drawing Sheets

METHODS AND APPARATUS FOR ON-LINE ANALYSIS OF FINANCIAL ACCOUNTING DATA

STATEMENT REGARDING FEDERALLY SPONSORED RESEARCH OR DEVELOPMENT

Not applicable.

BACKGROUND

In this specification, various headings and sub-headings have been used. It should be noted that the headings and sub-headings have been used merely for reasons of clarity and convenience and are not intended to have any legal effect.

FIELD OF THE INVENTION

The invention relates to methods, computer apparatus and computer programs for analysing financial accounting data and/or pre-processing financial accounting data in order to prepare validated up-to-date financial information such as management accounts, and sharing said information with third parties.

BACKGROUND OF THE INVENTION

The Need for Management Accounts

Management accounts are the primary report used by business to control, monitor and manage financial performance and financial position. Traditionally management accounts have been used internally by managers and directors to improve both the financial understanding of the business and the quality of decision-making Management accounts are now increasingly being demanded and used by external third parties, particularly by providers of credit and finance, to assess and price risk on an up-to-date basis, rather than reliance being placed on annual assessment using out-of-date statutory accounts. In the current economic climate the demand for and use of monthly management accounts is increasing exponentially.

The Expectations Gap

Following the onset of the "credit crunch" in 2007, access to credit for Small- and Medium-sized Enterprises (SMEs) has highlighted an increasing tension between conflicting perspectives on the situation forwarded by SME representatives (such as government bodies and pressure groups) and SME credit providers (most notably bank lenders and credit insurers). A root cause of these tensions is the end of the era of "easy credit", having exposed an expectations gap between SMEs and their credit providers, as characterised below:

|  | The SME perspective | The credit provider perspective |
| --- | --- | --- |
| Individuality | Want credit decisions to be based on their individual circumstances | Forced to rely on generic data about the SME, such as sector, age and location |
| Timeliness | Want credit decisions to be based on current performance | Can only view the financial performance of the SME from previous years |
| Reliability | Has internal information that demonstrates that they are viable and/or successful | Insufficiently confident that any additional information provided by the SME is reliable |

This expectations gap can be bridged by and/or through embodiments of the invention, which provide a mechanism through which SMEs can share their individual management accounts in a timely and reliable manner.

The Reliability Gap

Although management accounts are invaluable to both internal and external users, they suffer from a reliability gap due to the following issues:

The medium: The management accounts that are presented to managers and the board are generally not produced directly from the accounting software. Other software applications (such as spreadsheet software) are used to compile them, making it easy for the preparer to change any figures on the management accounts without posting the changes in the accounting software.

Diligence: Management accounts are generally prepared monthly or quarterly, and are therefore not reviewed and compiled with the same diligence as annual statutory accounts. As a result they may not be sufficiently complete and accurate to ensure that the Profit and Loss account and Balance Sheet present a reliable picture of the company's financial performance and financial position.

Scrutiny: Management accounts are not subject to any external independent scrutiny, such as an audit. The figures on management accounts accumulated over a year may differ significantly from statutory accounts submitted at year end. Therefore users, particularly external ones, can place only limited reliance on the quality of the management accounts they are using.

A trusted intermediary can overcome these issues through the use of the invention presented in this patent, by producing management accounts that are automatically prepared and validated.

Validation of the Data

Data quality is a fundamental issue with any data-dependent application, and it is an unfortunate problem that most SMEs are not as diligent at keeping their books up to date as they perhaps ought to be. This is certainly reflected in the data found in accounting packages, and as a result it is important to verify that the management accounts are up-to-date and accurate.

A check of the quality of bookkeeping will have a number of positive effects for both the SME, and the third party receiving the summarised data.

The credit product provider can gain an insight into the reliability of the data received The credit provider can insist on a certain level of quality they are prepared to accept With suitable feedback, the SME can gain an understanding of the quality of their bookkeeping, and how to improve it The SME will benefit from improved governance and understanding of the performance of their business, through accurate bookkeeping.

There is existing prior art which attempts to provide an interface through which financial information on businesses can be shared with providers of credit. This prior art requires the user to upload financial reports they have created manually from the accounting package in a summarised form such as the standard financial statements or a trial balance summary; they do not extract the transactional history from the accounting package, and they do not introduce the concept of an automated tool for doing so. Also the user has to manually map the financial information into a standardised form. Since they also do not extract and map the complete chart of accounts from the host accounting system, they are unable to perform this step automatically. The prior art provides only rudimentary rule based trigger alerts on the financial status of the company; they do not provide a method of comprehensively assessing the quality of the data that has been obtained (they cannot, as they do not have the transactional level of detail), and so can provide no confidence to the end consumer as to the reliability of the financial information they are receiving. The prior art provides financial reports constructed from the basic that has been uploaded to the system, for the date at which the uploaded data was created; they cannot provide the facility to compute financial representations of the state of the company at points in history, as they do not extract the transactional history from the accounting application. Examples of prior art in this field are US A 2005/0154628, US-A-2005/0240467, US-A-2005/0154769, U.S. Pat. Nos. 7,003,489, 6,850,908, and 6,850,643.

Reference is also made to the co-owned application U.S. Ser. No. 12/527,170, filed 7 Feb. 2008 and entitled "METHODS AND APPARATUS FOR ANALYSING AND/OR PRE-PROCESSING FINANCIAL ACCOUNTING DATA," the entire content of which is herewith incorporated herein by reference in its entirety and for all purposes. This document discloses several novel and advantageous techniques for analysing financial data. This document is generally concerned with providing a software tool to auditors and the like for online analysis of financial data in order to more efficiently prepare financial reports.

SUMMARY OF THE EMBODIMENTS OF INVENTION

According to a first aspect of an embodiment of the invention, there is provided an on-line method of analysing financial accounting data, the method comprising: receiving at a server uploaded financial accounting data from a client computer which includes a set of accounts A organised into account groups G; mapping the financial accounting data to an accounting ontology stored at the server, the ontology comprising at least a pre-defined set of primary category tags C and a pre-defined set of base level tags B each associated with a primary category tag C; wherein the step of mapping comprises: mapping account groups G to primary category tags C; and, mapping accounts A to base level tags B, wherein each base level tag B has an associated set expected account characteristics and wherein the mapping of accounts A to base level tags B is determined in accordance with the map of account groups G to primary category tags C and with matching the characteristics of the accounts A; and, analysing the data at the server.

Thus, embodiments of the invention can provide a method/automated tool which can connect to a wide variety of third party applications in order to obtain the financial information from them. As will be appreciated, accounts data comes in a wide variety of forms. It is therefore a considerable technical challenge to identify and organise this data such that the data can be properly analysed by an automated process. The preferred tool automatically extracts and transmits all of the underlying transactional data from the accounting application, rather than just a summary as in prior art schemes. Additionally, it extracts the chart of accounts information from the accounting application, and uses an automated accounting mapping component to automatically map the transactional data into a predefined accounting ontology. This mapping of accounts is more robust and sophisticated than the very limited attempts at organising accounting data made in the prior art and this allows a wide range of accounting data formats to be accurately mapped to a standard ontology. This facilitates in some embodiments, performing extensive validation checks over the data to ensure the quality of the bookkeeping in the accounting package, which it is able to do because it extracts the entire transactional history from the accounting package and can therefore apply tests to them. This facilitates the production of any financial report, with the appropriate figures computed for any point in the past covered by the transmitted data. Preferably the invention provides a web interface which allows the owner of the transmitted data to review the results of the account mapping, quality scoring, and financial report production, and share the resulting financial reports with third parties.

The set of primary category tags C preferably represent top level accounting concepts. The base level tags B preferably represent atomic low level accounting concepts.

In a preferred embodiment, the primary category tags include fixed assets, current assets, current liabilities, long term liabilities, capital and reserves, sales, cost of sales and other income and expenditure.

In a preferred embodiment, the step of mapping account groups comprises: if the accounting package already groups accounts A into fixed account groups G that are directly equivalent to the primary category tags C, then the method proceeds by mapping the accounts A in those account groups G directly to the equivalent primary category tags C. This provides a simple way of mapping account groups, and hence accounts in those account groups, to primary category tags where the structure of the accounts allows this.

In a preferred embodiment, in the accounting ontology each primary level tag C is associated with a range of account numbers range(c), and in the accounting data each account group G has an associated user-defined account number range range(g), wherein the step of mapping account groups comprises, for each account group G in turn: comparing the account number range of the primary level tags range(c) against the account number range of the account group range (g) to determine the level of intersection; and, if the level of intersection exceeds a predetermined threshold, mapping the account group G to the primary level tag C. Some accounting packages use unique account numbers to identify accounts standard number, and then group these into account groups by using ranges of numbers. Typically these accounting packages have a default set of account number ranges that define account groups that are directly equivalent to the primary category tags. However the account number ranges can be modified by the user, and so the preferred method maps the user-defined account number ranges to the primary category tags by comparison to the default account number ranges.

The preferred method of doing this proceeds by comparing the top level user-defined account number ranges against the default number ranges. The algorithm will build a map from account groups in the hierarchy to the primary category tags, matched: G->C. Preferably the method proceeds by for each user account group in turn moving iteratively through the primary account groups looking for a match. When a match is found within the threshold, the current account group is mapped to the current primary category tag and the next user account group, if any, is processed.

In a preferred embodiment, in the accounting data the account groups are arranged in a tree-like hierarchy, wherein each node in the tree represents an account group G, and is a subset of its parent node account group G, the step of mapping account groups comprising: arranging the account groups in the tree in a depth first order; identifying an accounting standard for the accounts based on the accounting data and arranging the primary level tags C in the order in which the accounts appear according to that standard, each primary level tag C being associated in the accounting ontology with a set of one or more possible names for an account group; and, for each account group G in the tree in order, attempting to fuzzy match the name of the account group G with said one or more possible names of the primary tags C taken in order; and, where a match is found, mapping the account group G to the primary level tag C.

Some accounting packages provide no standardised internal account groups that can be a priori mapped to the primary category tags, and which provide no standardised account numbering schemes. These accounting packages instead arrange the accounts into a tree-like hierarchical structure of groups of accounts, with a distinct name for each account group. The hierarchy at the highest level will be divided into two sub-trees: the Balance Sheet; followed by the Profit and Loss. Each node in the tree is an account group, and is a subset of its parent node account group. Although the account groups are user defined within each sub-tree, it can be assumed that the nodes will be arranged in order to correspond to the accounting standards for the locale of the user of the accounting package. For example, in the UK GAAP (Generally Accepted Accounting Principles), the first account group within the Balance Sheet will represent the Fixed Assets of the company.

The preferred method is configured with a set of possible names for each of the primary category tags. It then proceeds to map the account groups in each hierarchical tree by recursive descent through the tree, using fuzzy text-matching on the account group names against the primary categories tag names to identify corresponding primary categories for each account group node in the tree.

In a preferred embodiment, each base level tag B is associated with one or more criteria K characterising an account type by any one or more of information identifying the account, the expected transactions of the account or the expected balances of the account, wherein the step of mapping an account A to a base level tag B comprises: identifying a subset of base level tags B where the primary category tag C associated with the base level tag B matches the account group G of the account A matches; for each of the subset of base level tags B, evaluating the accounts against the criteria K for that base level tag; and, if the criteria match, mapping the account A to the base level tag B and excluding the matched base level tag B from consideration for matching of subsequent accounts A.

In a preferred embodiment, the criteria comprise one or any combination of the following: expected text terms to fuzzy match against the account name; the expected percentage of debit and credit transactions in the account over a given time period; the expected sign of the sum of all transactions in the account over a given time period; and, the expected balance of the account at the end of a given time period.

An account which fits a base level tag criteria will be mapped to its base level tag. Once an account has been mapped through a base level tag criterion, it will be excluded from being tested against any further base level tag criteria. This means that the order in which the base level tag criteria are applied to the accounts is critical. Preferably the order in which they are listed above.

In a preferred embodiment, the criteria K include a catch all matching rule which matches any remaining unmapped accounts A to a default base level tag B after all other criteria have been applied to ensure that all accounts become mapped.

In a preferred embodiment, the ontology comprises a pre-defined set of dynamic tags D; the method comprising mapping primary tags C, base tags B and/or previously mapped dynamic tags D to dynamic tags D using set arithmetic operations including any one or combination of union, intersection, and complement operations.

The dynamic tags D represent accounting concepts which are not atomic, which are defined in terms of base tags B and primary category tags C, and which are used as a short-hand mechanism through which commonly used complex accounting concepts or financial value computations can be easily accessed, The dynamic tags definition is expressed in terms of set arithmetic operations applied to primary category, base level, and other dynamic tags. The set arithmetic operations are applied to the account groups to which these tags are mapped, to produce a new account group to which the dynamic tag is mapped.

According to a second aspect of an embodiment of the invention, there is provided an on-line method of analysing financial accounting data comprising: receiving at a server uploaded financial accounting data from a client computer; mapping the abstracted data to an accounting ontology stored at the server; evaluating the accounts data at the server against a set of plural tests for bookkeeping and accounting problems; computing a score for the accounts according to the results of applying the tests to the accounts.

In some embodiments, the invention performs extensive validation checks over the data to ensure the quality of the bookkeeping in the accounting package, which it is able to do because it extracts the entire transactional history from the accounting package and can therefore apply tests to them. This facilitates the production of any financial report, with the appropriate figures computed for any point in the past covered by the transmitted data. Providing a score allows more sophisticated and informed decisions to be made by those looking at the accounting data. Preferably embodiments of the invention provides a web interface which allows the owner of the transmitted data to review the results of the account mapping, quality scoring, and financial report production, and share the resulting financial reports with third parties.

In a preferred embodiment, the method comprises giving the accounts an initial perfect score and then applying a penalty to the score for each test failed. For example, the score can be compiled by first assigning a perfect 100% score to the data set uploaded into the server. The system performs a range of different categories of tests that may be one or any combination of the tests explained in detail below. For each test, a percentage penalty will be applied if that test is failed, in whole or in part. The size of the penalty reflects the significance of failure of the test, and may vary depending upon a level of materiality that is applied to each test category. A percentage ranking is obtained by multiplying all the reciprocals of all the percentage penalties applied to the starting 100%, reducing the score downwards from 100%.

In a preferred embodiment, the method comprises categorising the quality of the accounts, each category having a high and low threshold applied to the score. The final resulting percentage determines the score that is assigned to the financial information. The score is computed from the percentage such as "Excellent": 80% to 100% score, "Good": 60% to 80% score, etc.

In a preferred embodiment, the penalty depends on at least one of: the type of test being applied; the level of materiality of the test; and, the degree to which the test is failed.

Some tests are more important than others, a fact which is reflected by giving different penalties to different tests. The materiality of the tests reflects the fact that the significance of an "error" value calculated from the accounts may depend on the "size" of the accounts. For example, a test may look for the amount of some discrepancy in the accounts. However, it may be undesirable to specify an absolute amount above which the penalty is applied, since the significance of the discrepancy may depend on the size of the accounts, e.g. volume and size of transactions and balances. For example, a $1000 discrepancy may be significant in an account having a balance of $5000, but insignificant in an account having a balance of $1,000,000. Thus, a preferred metric may compare the discrepancy or error value found in the accounts with some materiality value calculated from the accounts to find a normalised error value. Other tests may apply a penalty depending on the degree to which the test is failed. For example, no penalty may be applied below a certain threshold, a maximum penalty may be applied over a certain threshold, and/or a sliding scale may be applied between the two thresholds.

In a preferred embodiment, at least one test comprises finding an error value as a function of transactions and/or balances posted to the accounts in the financial accounting information; finding a first materiality score as a function of transactions and/or balances posted to the accounts in the financial accounting information under which a minimum penalty is imposed; finding a second materiality score as a function of transactions and/or balances posted to the accounts in the financial accounting information over which a maximum penalty is imposed; between the first and second materiality scores, scaling the penalty between the minimum and maximum scores.

In a preferred embodiment, if the error value is below a threshold amount, no penalty is imposed.

In a preferred embodiment, the second materiality score is a function of the first materiality score.

In a preferred embodiment, the error value is any one or combination of: a) the absolute difference between the total sum of debit balances on the trial balance at the end of the most recent month and the total sum of credit balances on the trial balance at the end of the most recent month; b) the difference between the total sum of the aged list or lists of creditors and the total sum of closing balance or balances on the creditors control account or accounts; c) the difference between the total sum of the aged list or lists of debtors and the total sum of closing balance or balances on the debtors control account or accounts; d) the total sum of the absolute values of unreconciled VAT transactions with a transaction date earlier than n months before the end of the most recent month, where n is a predefined system parameter; e) the total sum of the absolute values of unreconciled bank payments with a transaction date earlier than p months before the end of the most recent month, where p is a predefined system parameter; f) the total sum of the absolute values of unreconciled bank receipts with a transaction date earlier than q months before the most recent month, where q is a predefined system parameter; g) the ratio of the sum of transactions on all accounts tagged as wages in a month compared to that of the following month; i) the absolute value of transactions of all accounts tagged as accruals in a month; j) the sum total balance of any account or accounts tagged as accruals at the end of a month; and, p) the total absolute sum of transactions in the stock accounts over a month.

In a preferred embodiment, the first materiality is a function of turnover and/or total costs over a recent period, and/or total assets at a recent point of time.

In a preferred embodiment, at least one test comprises finding an error value as a function of transactions and/or balances posted to the accounts in the financial accounting information for each of plural months culminating with the most recent month, wherein the test score is the sum of penalties applied to each month and wherein the highest penalty is for the most recent month.

In a preferred embodiment, the test is applied only if the average balance of the net book value of tangible assets at the end of each month over the last n months exceeds a fixed value, and the penalty is determined to be a fixed value, by testing if i) the depreciation charge in the most recent month is zero; or if ii) the total sum of the depreciation charges in the last n months is less than a minimum acceptable materiality of a percentage of the average balance of the net book value of tangible assets at the end of each month over the last n months.

In a preferred embodiment, any one or more of the following tests are used: k) the error is the total sum of the absolute values of all unexpected transactions in the profit and loss over the past n months, where n is a predefined system parameter, and the materiality is a function of all sales or costs; l) the error is the total sum of the absolute values of all unexpected transactions in the balance sheet over the past n months, where n is a predefined system parameter, and the materiality is a function of total assets; m) the error is the total sum of all debit closing balances on any income accounts in the profit and loss and the sum of all credit closing balances on any expense accounts in the profit and loss, and the materiality is a function of the sum of all debit closing balances on trial balance and the sum of all credit closing balances on trial balance; n) the error is the total sum of all debit balances on any liability accounts in the balance sheet and the sum of all credit balances on any asset accounts in the balance sheet, and the materiality is a function of the sum of all debit closing balances on trial balance and the sum of all credit closing balances on trial balance; and, o) the error is the average delay in posting transactions to the accounting package.

According to a third aspect of an embodiment of the invention, there is provided an on-line method of analysing financial accounting data combining any of the methods described above.

In an embodiment, the method comprises providing the results of the analysis or the score to an interested third party, such as credit industry, regulatory, or government bodies. This allows the third party to rate the quality of the accounts data and thereby gain more confidence about any conclusions drawn from the accounts data. For example, a credit rating agency may use the accounts data to evaluate the credit worthiness of a customer. However, without knowing the quality of the bookkeeping that has generated those accounts, the credit agency is not in a position to be confident on the credit worthiness decision calculated based on those accounts and so cannot accurately determine whether to extend credit or the amount of credit. Embodiment of the invention in this aspect allow the credit agency to make a more informed decision by presenting the credit agency with the results of the analysis or score of the quality of the accounts based on all of the accounting data which has been automatically generated by the system. This allows the credit rating agency to make a better decision as to whether or not credit should be extended to the customer.

According to a fourth aspect of an embodiment of the invention, there is provided a server constructed and arranged to carry out the method described above.

According to a fifth aspect of an embodiment of the invention, there is provided a computer program, optionally recorded on a physical carrier, containing program instructions for causing a computer to carry out a method described above.

Thus, in certain preferred embodiments, the invention provides a method for the sharing of validated normalised financial information with third parties; provides users of a variety of different accounting applications with an interface which automatically extracts accounting data from those accounting applications, and uploads it for analysis; automatically derives a map from the user's accounting data to a generic accounting ontology (an "ontology" here being an explicit formal specification of how to represent the objects and other entities that are assumed to exist in the accounting data and the relationships that hold among them); uses the accounting ontology map to analyse the accounting data for the quality of the bookkeeping, and to produce normalised management accounts; presents the results to the user through a web-based interface; and allows the user to authorise the management accounts to be shared with an interested third party.

BRIEF DESCRIPTION OF DRAWINGS

Embodiments of the invention will now be described by way of example with reference to the accompanying drawings, in which.

DETAILED DESCRIPTION

Figure 1:
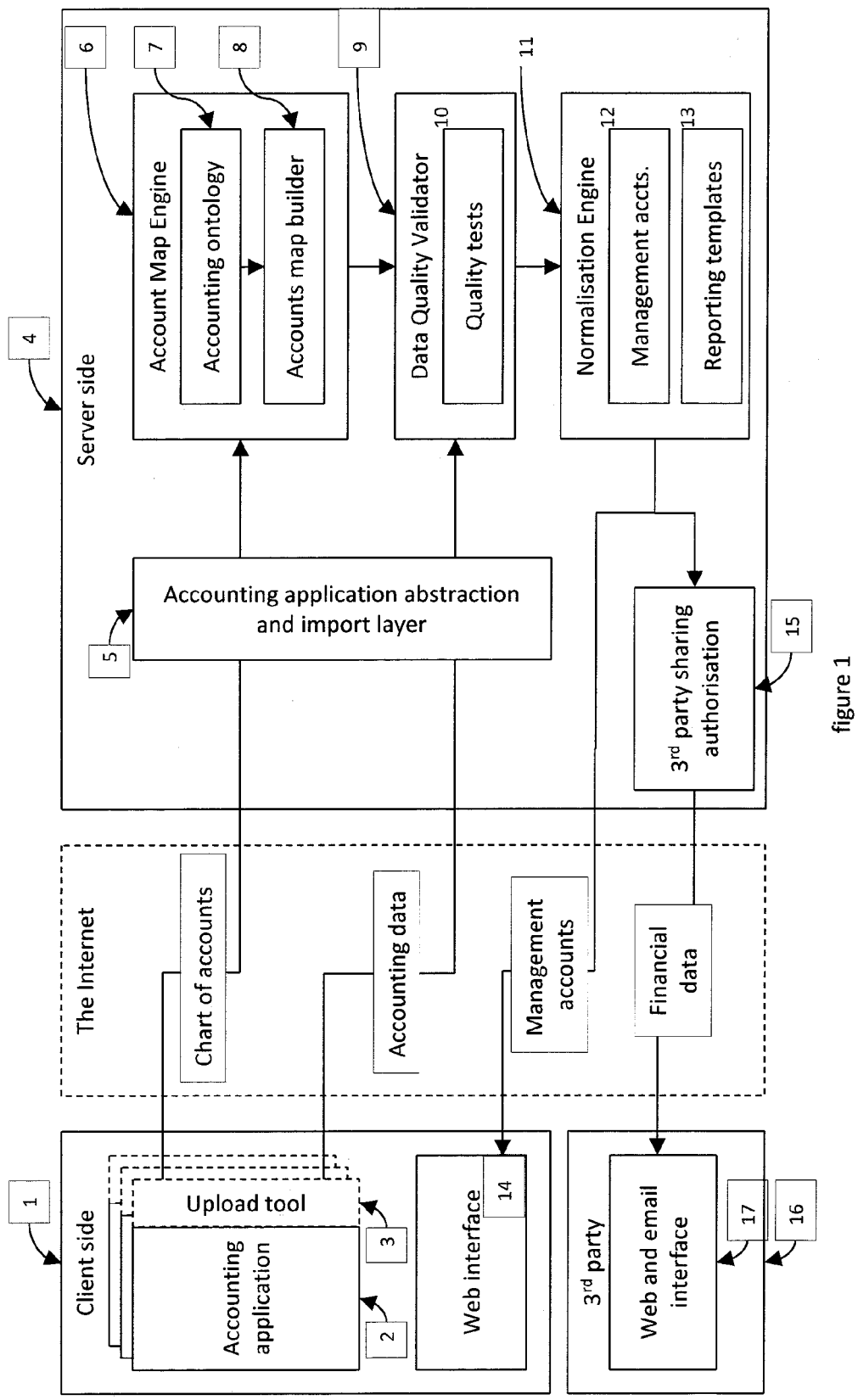
FIG. 1 shows schematically an example of the apparatus and interaction between a client and a server across the Internet, and the processing of data at the server, in accordance with an embodiment of the invention.
Figure 2:
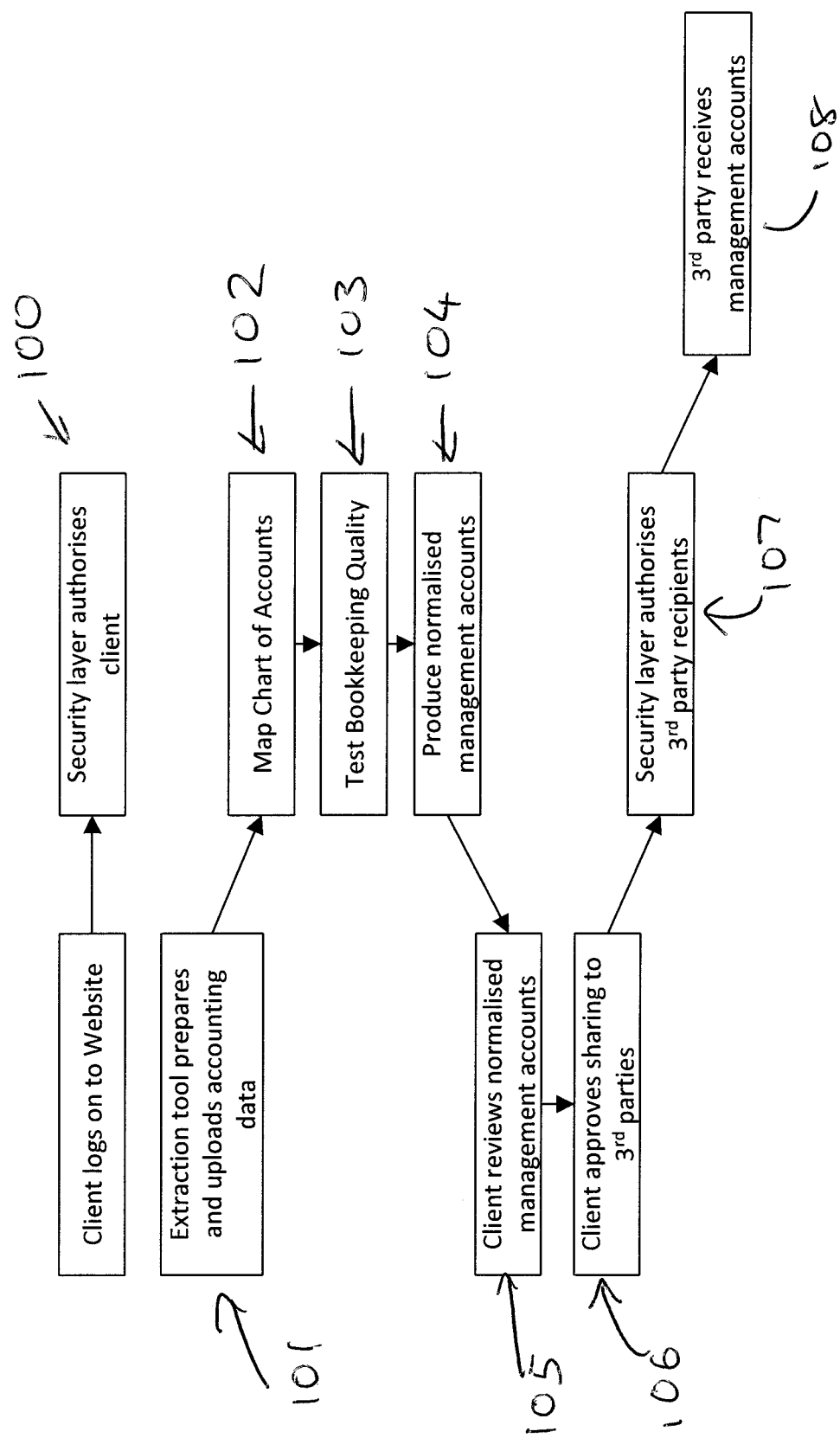
FIG. 2 shows schematically an example of a method according to a preferred embodiment of the invention for the sharing of validated normalised financial information with third parties.

FIG. 1 shows a preferred example of apparatus for the analysis of financial accounting data to produce quality-controlled management accounts for sharing with third parties and FIG. 2 shows schematically an example of a method according to a preferred embodiment of the invention for the sharing of validated normalised financial information with third parties. At step 100, a client computer 1 having an accounts package loaded thereon is logged onto a website provided by a server 4. A security layer at the website authorises the client 1. The server downloads and configures an upload tool 3 on the client computer 1 which automatically extracts transactional accounting data and the chart of accounts from the accounting system 2 on the client computer 1, and transmits the data to the server 4 (step 101). The server 4 has a component 5 which is able to create an abstract representation of the transmitted data, and import it into the server side system 5. The server 4 has an account mapping engine 6 which contains a predefined accounting ontology 7, onto which the accounts map builder 8 maps the chart of accounts contained in the transmitted data (step 102). The apparatus has a data quality validator component 9, which runs a number of data quality tests 10 over the transmitted data (step 104). The apparatus also has a normalisation engine 11 which uses the accounts map to build normalised management accounts 12, and other financial reporting templates 13 (step 105). A representation of the management accounts and their quality is transmitted to the client computer through a web interface 14 and displayed to the user of the client computer 1 (step 105). The server 4 also has an authorisation portal 15 which allows the owner of the accounting data to authorise (step 106) the sharing of the validated management accounts with a third party recipient 16 through a web or email interface 17 (step 107 and 108).

Data Upload

Figure 3:
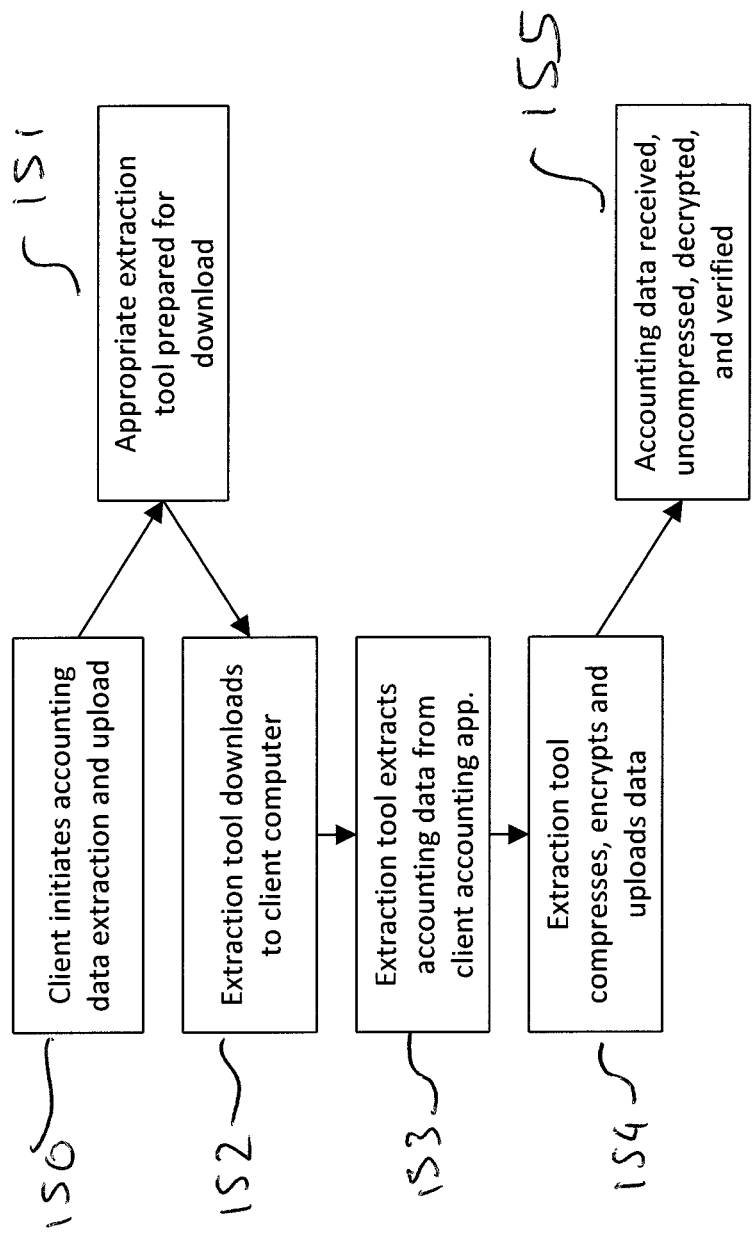
FIG. 3 shows schematically an overview of an example of an interaction between a client and a server computer to automatically configure an upload tool on the client computer, and to use this tool to extract and upload financial data to the server across the Internet.

Certain preferred embodiments provide an automated software component through which data can be uploaded to a web-based server 4 from the accounting software on the user's personal computer 1. In a preferred embodiment, the system provides a tool 3 which has been tailored for each target accounting application, which is downloaded to the client computer 1 and which automates the process of extracting, compressing, encrypting, and uploading the data from the client computer 1 to the web-based server 4. FIG. 3 shows this in more detail. After the client 1 initiates accounting data extraction and upload (step 150), the appropriate extraction tool 3 is then prepared for download at the server 4 (step 151) and downloaded to client 1 (step 152). The extraction tool 3 extracts accounting data from the accounting package on the client computer 1 (step 153). The data is compressed, encrypted and uploaded to the server 4 (steps 154 and 155).

The data which is extracted from the accounting package includes, but is not limited to:

The entire transaction history;
summary histories in the form of period aggregated totals;
the sales and purchase ledgers; and
the chart of the accounts.

The Chart of Accounts

Accounting software programs maintain a structured set of accounts through which transactions are processed. Each account is related to a specific accounting notion and lies in a distinct position on the profit and loss or balance sheet statements (the financial statements). These distinct accounts are commonly enumerated in a tabulated presentation known as the "Chart of Accounts." The Chart of Accounts presents all of the accounts used by the system and orders them into a logical sequence reflecting the financial statements and the accounts' positions within them. Accounting software programs allow their users to heavily customise the Chart of Accounts to reflect their own business processes and structure.

In order for the server to be able to analyse the accounts contained within the Chart of Accounts in the appropriate manner, it must be able to correctly categorise the accounts into the areas of the financial statements in which they properly lie.

An important aspect that contributes to the portability of certain embodiments of the invention to different accounting software programs is the underlying model of the financial statements, referred to herein as the "Account Map." This map links the accounts in the contained in the Chart of Accounts to an abstract representation of generic accounting concepts called an "Accounting Ontology," allowing the preferred embodiments to create rules, ratios, and other underlying elements in a non-package-specific format, maintaining portability and the ease of development of the system for other accounting packages.

Figure 4:
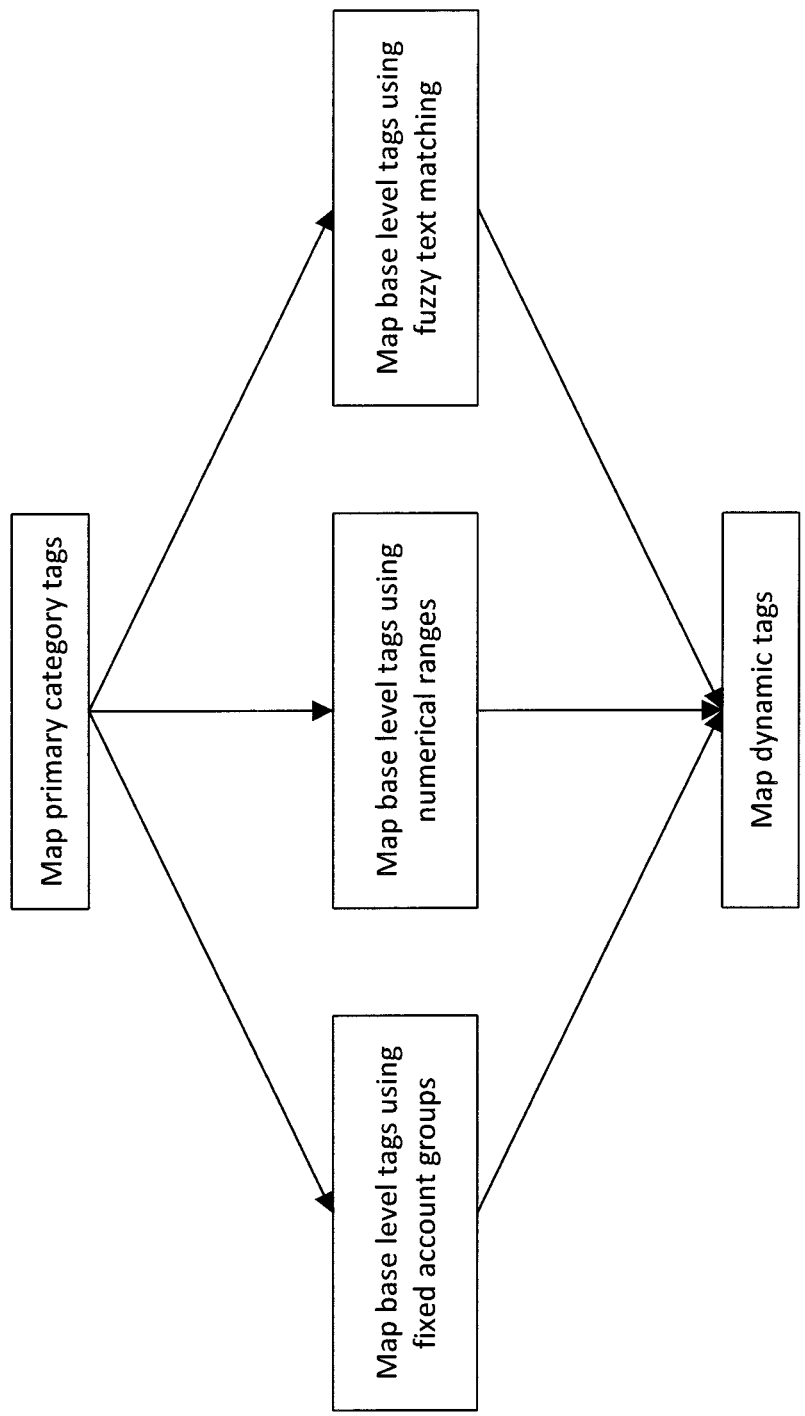
FIG. 4 shows an example of a method for mapping a set of accounts to tags representing an accounting ontology; and, FIGS. 5 to 7 shows examples of processes for mapping accounts to tags according to embodiments of the invention.

An automated analysis and mapping process is used to create the map from the Chart of Accounts of the data file being uploaded (see FIG. 4).

Example:

Consider a company Widgets inc, with the following a simplified example of a chart of accounts. The accounts have a name and number, and are grouped into separate account groups, each of those within a different financial statement.

| Account name | Account number | Account group | Statement |
|---|---|---|---|
| Office equipment costs | 1001 | Tangible Assets | Balance Sheet |
| Office equipment depr. | 1002 | Tangible Assets | Balance Sheet |
| Stock | 2003 | Current Assets | Balance Sheet |
| Debtors | 2004 | Current Assets | Balance Sheet |
| Cash & equivalents | 2005 | Current Assets | Balance Sheet |
| Creditors | 3001 | Current Liabilities | Balance Sheet |
| Tax | 3002 | Current Liabilities | Balance Sheet |
| Credit Card | 3003 | Current Liabilities | Balance Sheet |
| Bank loan | 4001 | Long Term Liabilities | Balance Sheet |
| Mortgage | 4002 | Long Term Liabilities | Balance Sheet |
| Shareholders' equity | 5001 | Equity and Reserves | Balance Sheet |
| Profit & loss account | 5002 | Equity and Reserves | Balance Sheet |
| Domestic sales | 6001 | Turnover | Profit and Loss |
| International sales | 6002 | Turnover | Profit and Loss |
| Discounts | 6003 | Turnover | Profit and Loss |
| Component purchases | 7001 | Direct Expenses | Profit and Loss |
| Direct labour | 7002 | Direct Expenses | Profit and Loss |
| Rent | 8001 | Overheads | Profit and Loss |
| Heat & light | 8002 | Overheads | Profit and Loss |
| Salaries | 8003 | Overheads | Profit and Loss |
| Other income | 9001 | Other Costs & Income | Profit and Loss |
| Other costs | 9002 | Other Costs & Income | Profit and Loss |

Accounting Ontology

The Accounting Ontology provides a framework of accounting categories represented by sets of tags. A pre-defined framework of accounting concept categories is defined internally, in a form that is independent of any target accounting application. Predefined ontologies can be read from storage, such as from disk storage, at the server or elsewhere. An ontology is defined in terms of the following sets of tags:

A pre-defined set of base level tags $B=\{b_1, b_2, b_3 \ldots \}$
A pre-defined set of primary category tags $C=\{c_1, c_2, c_3 \ldots \}$
A pre-defined set of dynamic tags $D=\{d_1, d_2, d_3 \ldots \}$ Chart of Accounts Map An accounting application abstraction layer reads in the user's Chart of Accounts from the uploaded Accounting data. A map builder module in the ontology engine assigns each of the accounts in the Chart of Accounts to nodes in the Accounting Ontology. This map can assign multiple accounts within the Chart of Accounts to each node in the Accounting Ontology. The greatest accuracy is achieved when the Chart of Accounts has been correctly mapped to the Accounting Ontology.

Assumptions

The system is given:

A set of accounts from the accounting package, $A=\{a_1, a_2, a_3 \ldots \}$, along with any associated accounting structure and transactions stored in the accounting package.

A pre-defined set of base level tags $B=\{b_1, b_2, b_3 \ldots \}$
A pre-defined set of primary category tags $C=\{c_1, c_2, c_3 \ldots \}$
A pre-defined set of dynamic tags $D=\{d_1, d_2, d_3 \ldots \}$ An account group is defined to be either a set of accounts, or a single account on its own (a set of one account).

Objective

The objective is to define an "account map", which consists of three sub maps:

A->B, A->C, and A->D.

The accounting structure given by the accounting package will define account groups. Additionally, the account map allows a tag to represent an account group, by associating it with the set of accounts that are mapped to it through the account map.

Mapping Process

The process of building the Account Map goes through 3 stages (see FIG. 4):

1. Map accounts found in the accounting package to primary category tags (define sub map A->C)
2. Map accounts found in the accounting package to base level tags, using the primary category tags sub map created in step 1 as a guide (define sub map A->B)
3. Map accounts found in the accounting package to dynamic tags, using the sub maps created in steps 1 and 2 (define sub map A->D).

Each of these mapping steps is described in more detail below.

1. Mapping Primary Category Tags

In a preferred embodiment, the primary category tags are fixed, and are:

Balance Sheet
  Fixed Assets
  Current Assets
  Current Liabilities
  Long Term Liabilities
  Capital and Reserves
Profit and Loss
  Sales
  Cost of Sales
  Other Income and Expenditure The method of mapping account groups into these primary categories is dependent on the type of data that is available in the accounting package. Three possible embodiments of the mapping approach are described below:

Accounting Applications with Fixed Account Groups Equivalent to Primary Category Tags If the accounting package already groups accounts into fixed account groups that are directly equivalent to the primary category tags, then the method proceeds by mapping the account groups and the accounts in those account groups directly to the respective primary category tags.

Example:

Widget Inc's chart of accounts includes three accounts in the "Turnover" account group:

Domestic sales
International sales
Discounts

The "Turnover" account group is directly equivalent to the primary category tag "Sales". Therefore these accounts are mapped via A->C to the primary category tag "Sales". Through the map, the "Sales" tag represents the account group {Domestic sales; International sales; Discounts}.

Accounting Applications with Account Groups Defined by Number Ranges

Some accounting packages use unique account numbers to identify accounts standard number, and then group these into account groups by using ranges of numbers.

Typically these accounting packages have a default set of account number ranges that define account groups that are directly equivalent to the primary category tags. However the account number ranges can be modified by the user, and so the method maps the user-defined account number ranges to the primary category tags by comparison to the default account number ranges.

Figure 5:
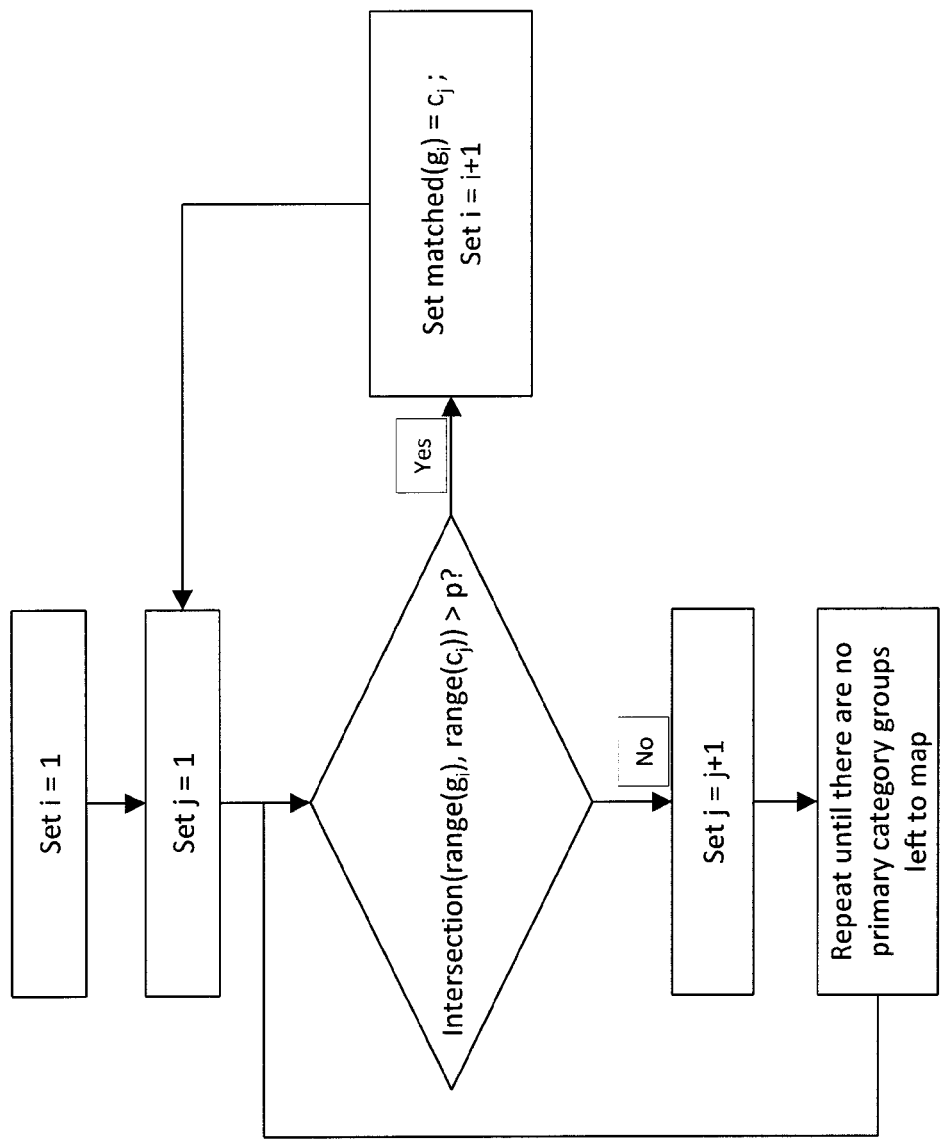

The method proceeds by comparing the top level user-defined account number ranges against the default number ranges (see FIG. 5).

Given:
A set G of top level account groups extracted from the accounting package $\{g_1, g_2, g_3, \ldots\}$, each account group associated with a user defined account number range range(g).

A sequence C of primary category tags $\{c_1, c_2, c_3, \ldots\}$ each primary category tag associated with a default account number range range(c).

An intersection measure, intersection(range(x), range(y)) which determines the percentage of range(x) that is covered by range(y)

A user defined tolerance percentage parameter p

The algorithm will build a map from account groups in the hierarchy to the primary category tags, matched: G->C.

The algorithm proceeds as follows:
1. Set the pointer for the current user defined account group, to 1.
   a. Set i=1
2. Set the pointer for the current primary category tag to 1.
   a. Set j=1
3. If intersection(range($g_i$), range($c_j$))>p, map the current account group to the current primary category tag, and move to the next user defined account group
   a. Set matched($g_i$)=$c_j$
   b. Set i=i+1
   c. If there are user defined account groups remaining, go to 2
4. Otherwise, move to the next primary category tag
   a. Set j=j+1
   b. If there are primary category tags remaining, go to 3

The map matched: G->C from accounts groups to primary category tags can then be used to create the map from accounts to primary category tags A->C, by mapping each account a in A to the primary category tags which the account groups in G that contain a are mapped.

Example:
Widgets Inc's chart of accounts has an account group called "Tangible Assets", which is assigned the range 1000-1900. The accounts called "Office equipment costs" with number 1001, and "Office equipment depr." with account number 1002, are therefore members of this group. The primary category tag "Fixed Assets" is assigned the default range 1000-1999, which intersects significantly with the range for the account group "Tangible Assets", which is therefore mapped to it. Finally, the accounts "Office equipment costs" and "Office equipment depr." are mapped to "Fixed Assets".

Accounting Applications with Named User-Defined Account Groups

Some accounting packages provide no standardised internal account groups that can be a priori mapped to the primary category tags, and which provide no standardised account numbering schemes.

These accounting packages arrange the accounts into a tree-like hierarchical structure of groups of accounts, with a distinct name for each account group. The hierarchy at the highest level will be divided into two sub-trees: the Balance Sheet; followed by the Profit and Loss. Each node in the tree is an account group, and is a subset of its parent node account group. The tree can be two or more levels deep.

Although the account groups are user defined within each sub-tree, it can safely be assumed that the nodes will be arranged in order to correspond to the accounting standards for the user's locale. For example, in UK GAAP (Generally Accepted Accounting Practice in the UK), the first account group within the Balance Sheet will represent the Fixed Assets of the company.

Figure 6:
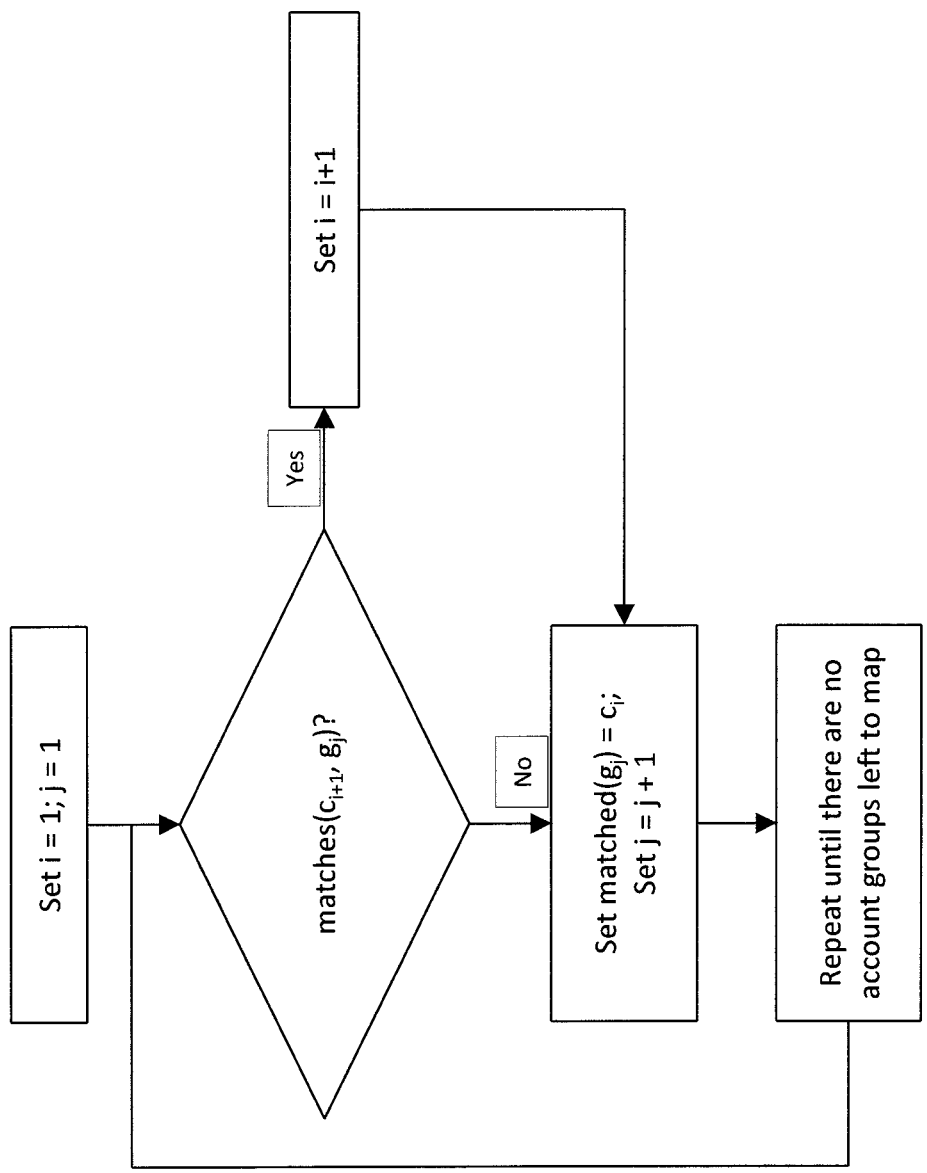

The method is configured with a set of possible names for each of the primary category tags. It then proceeds to map the account groups in each hierarchical tree by recursive descent through the tree, using fuzzy text-matching on the account group names against the primary categories tag names to identify corresponding primary categories for each account group node in the tree (see FIG. 6).

Given:
A hierarchical tree T of account groups extracted from the accounting package, with nodes $\{g_1, g_2, g_3 \ldots\}$ arranged in depth first order (usually arranged at the highest level into the Balance sheet followed by the Profit and Loss).

A sequence C of primary category tags $\{c_1, c_2, c_3 \ldots\}$ arranged in order according to the accounting standards of the relevant locale (again, arranged at the highest level into the Balance sheet followed by the Profit and Loss), each tag given a set of possible names for matching.

A fuzzy text matching algorithm matches ($c_i$, $g_j$) which returns true if one of the names of the primary category tag $c_i$ approximately matches the name of the account group $g_j$.

The algorithm will build a map from account groups in the hierarchical tree to the primary category tags, matched: T->C.

The algorithm proceeds as follows:
1. Set the pointers for the current primary category tag, and the current account group, to 1.
   a. Set i=1; j=1
2. If the current account group matches the next primary category tag, then move to the next one:
   a. if matches($c_{i+1}$, $g_j$), then i=i+1
3. Map the current account group to the current primary category tag:
   a. Set matched($g_j$)=$c_i$
4. Move to the next account group:
   a. j=j+1
5. Repeat from step 2, until there remains no more account groups in the hierarchy left to map.

The map matched: T->C from accounts groups to primary category tags can then be used to create the map from accounts to primary category tags A->C, by mapping each account a in A to the primary category tags which the account groups in T that contain a are mapped.

Example:
Widget Inc's account groups are arranged in the following hierarchy:

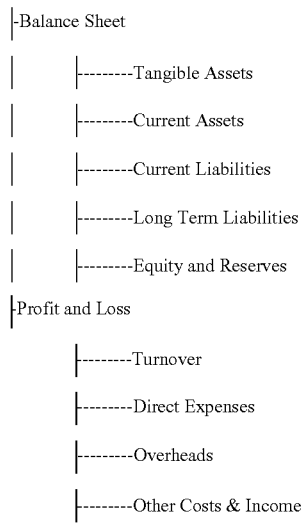

```
|-Balance Sheet
|       |--------Tangible Assets
|       |--------Current Assets
|       |--------Current Liabilities
|       |--------Long Term Liabilities
|       |--------Equity and Reserves
|-Profit and Loss
        |--------Turnover
        |--------Direct Expenses
        |--------Overheads
        |--------Other Costs & Income
```

Following the mapping algorithm, the account groups are mapped by matched: T->C in the following manner:
Tangible Assets->Fixed Assets
Current Assets->Current Assets
Current Liabilities->Current Liabilities
Long Term Liabilities->Long Term Liabilities
Equity and Reserves->Capital and Reserves
Turnover->Sales
Direct Expenses->Cost of Sales
Overheads->Other Income and Expenditure
Other Costs & Income->Other Income and Expenditure 2. Mapping the Base Level Tags The objective of this step is to map each of the accounts from the accounting package into the base level tags. Each account can only be mapped to a single base level tag. It will have been mapped to a primary category tag by the previous step.

The following method for mapping the base level tags uses base level tag criteria to map the individual accounts. A base level tag criterion is defined with the following:
- A base level tag in B to which accounts that fit this criterion will be mapped.
- A restriction in the form of a primary category tag—the account must be mapped to this primary category tag for this criterion to apply.
- One or more of the following matching rules, which will be tested against the account under consideration:
  - Expected text terms to fuzzy match against the account name
  - Expected percentage of debit and credit transactions in the account over a given time period
  - Expected sign of the sum of all transactions in the account over a given time period
  - Expected balance of the account at the end of a given time period
  - A "catch all" matching rule—which by default matches any account, used to map the accounts that remain after all other criteria have been applied. There should be a criterion which includes one of these for each of the primary categories, to ensure that all accounts become mapped.

Figure 7:
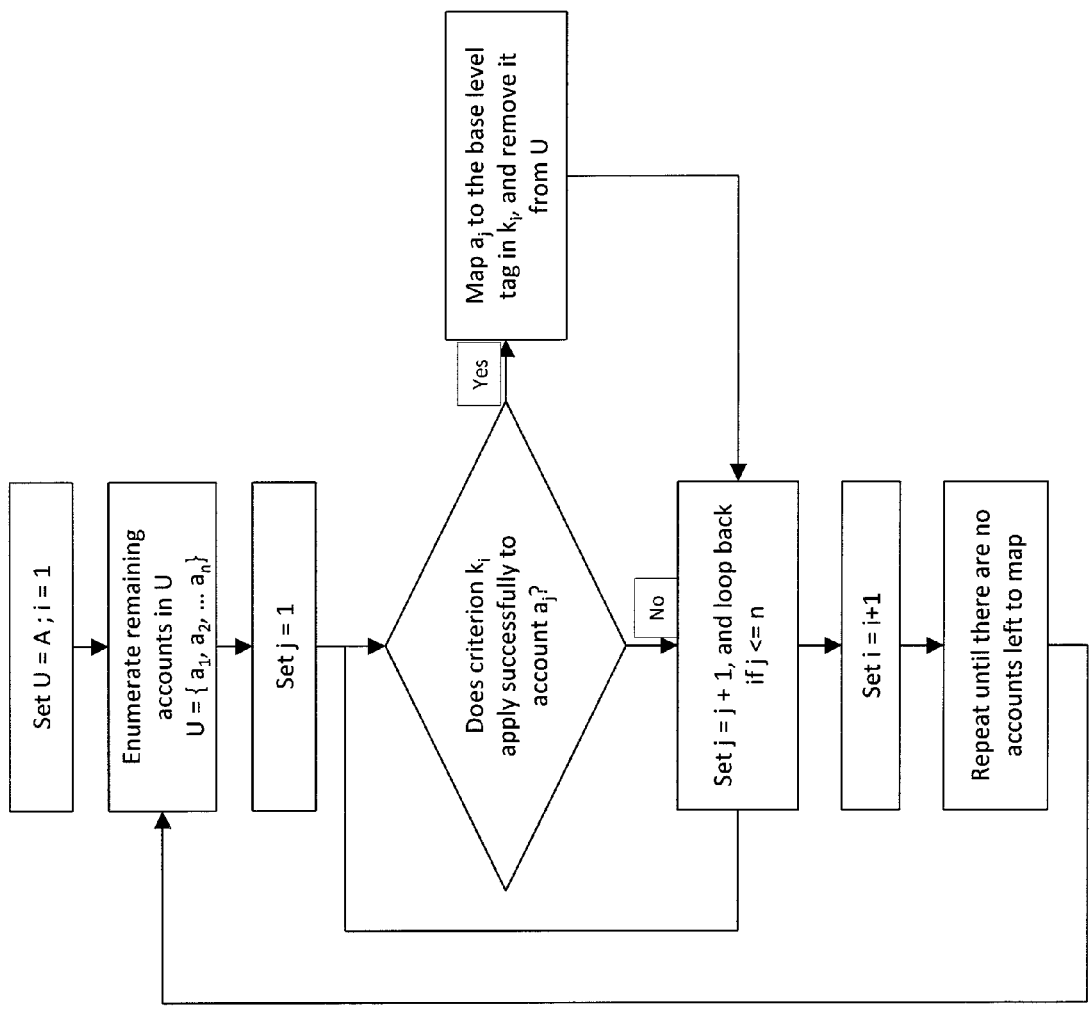

An account which fits a base level tag criteria will be mapped to its base level tag. Once an account has been mapped through a base level tag criterion, it will be excluded from being tested against any further base level tag criteria. This means that the order in which the base level tag criteria are applied to the accounts is critical (see FIG. 7).

Given:
A set A of accounts, $\{a_1, a_2, a_3, \ldots\}$ to be mapped, extracted from the accounting package.
A map from the accounts to the primary category tags A->C, computed in step 1.
An ordered list of base level tag criteria, $K=\{k_1, k_2, k_3, \ldots\}$.

The algorithm will build a map from the accounts to the base level tags A->B. The algorithm proceeds as follows:
1. Set the pointer for the current base level tag criterion to 1:
   a. Set i=1
2. Let $U=\{a_1, a_2, \ldots a_n\}$ be the set of accounts that have not yet been mapped. Initially U =A.
3. Set the pointer for the current unassigned account to 1:
   a. Set j=1
4. If account $a_j$ matches all the criteria in then map $a_j$ to the base level tag in $k_i$, and remove it from U.
5. Move to the next unassigned account:
   a. Set j=j+1
6. Repeat from step 4 until all the accounts have been tested
7. Move to the next base level tag criterion:
   a. Set i=i+1
8. Repeat from step 2, until all base level tag criterion have been applied.

Example:
A base level criterion which maps the base level tag "Tangible Assets Depreciation" might be the following:
Base level tag: Tangible Assets Depreciation
Primary category tag restriction: Fixed Assets
Matching Rules:
  The account name must fuzzy text match "depr"
  The account must have 100% credit transactions
  The account must end in a credit balance
An account called "Office equipment depr." is mapped to the "Fixed Assets" primary category, and contains only credit transactions, ending in a credit balance. It is therefore mapped to the "Tangible Assets Depreciation" base level tag.

3. Mapping the Dynamic Category Tags

The dynamic category tags are mapped after steps 1 and 2 have been performed. The mapping is created by rules that combine the account groups defined by the primary category and base level tags, and also previously mapped dynamic tags. The combinations are defined using the set arithmetic operations union, intersection, and complement.

The dynamic tags definition is expressed in terms of set arithmetic operations applied to primary category, base level, and other dynamic tags. The set arithmetic operations are applied to the account groups to which these tags are mapped, to produce a new account group to which the dynamic tag is mapped.

Example:
The dynamic tag "VAT Balance" is defined to be the union of the Base level tags "Sales VAT" and "Purchase VAT". The "Sales VAT" base level tag is mapped to the account group {"export sales VAT", "domestic sales VAT"}, and the "Purchase VAT" base level tag is mapped to the account group {"purchases VAT"}. "VAT Balance" is therefore mapped to the account group {"export sales VAT", "domestic sales VAT", "purchases VAT"}.

Chart of Accounts Editor

The preferred embodiment of the chart of accounts mapping system provides an interface through which the user can edit the map from the Chart of Accounts to the Accounting Ontology. The editor presents the default ontology to the user, with each node indicating to which accounts in the underlying accounting package it has been mapped. If the user wishes to modify any element of the map, for example by moving an account to a different node in the ontology, the user can select the account (e.g. by clicking on a graphical representation), drag it to another node in the ontology, and release it. That account will then be remapped to the new node indicated by the user.

Validation of Data Quality

A validation and analysis engine is provided, the core validation element of which inspects entries in the data for a wide range of potential bookkeeping and accounting problems, and builds a representative score from them. The purpose of the score is to provide a measure of quality or reliability over the summarised accounts that SMEs submit to third parties.

Methodology of the Score

The score is compiled by first assigning a perfect 100% score to the data set uploaded into the server. The system performs a range of different categories of tests that are explained in detail below. For each test, a percentage penalty will be applied if that test is failed, in whole or in part. The size of the penalty reflects the significance of failure of the test, and may vary depending upon a level of materiality that is applied to each test category. A percentage ranking is obtained by multiplying all the reciprocals of all the percentage penalties applied to the starting 100%, reducing the score downwards from 100%. The final resulting percentage determines the score that is assigned to the financial information. The score is computed from the percentage as follows:

| Score | Low threshold | High threshold |
|---|---|---|
| Excellent | 80% | 100% |
| Good | 60% | 80% |
| Satisfactory | 40% | 60% |
| Poor | 20% | 40% |
| Very Poor | 0% | 20% |

The following sections describe tests that can be applied to compute the score:

a) Trial Balance Matches

This measure determines whether the total of debit and credit balances on the trial balance match. It is based on the absolute difference between the total sum of the debit and credit balances of the accounts, and has a small tolerance for rounding errors before any penalty is applied. Up to a computed materiality level, a smaller penalty is applied. Over a larger materiality level, the full penalty is applied. Between the two materiality levels, the penalty level is scaled linearly.

1. Compute total sum of debit balances on the trial balance at the end of the most recent month=A
2. Compute total sum of credit balances on the trial balance at the end of the most recent month=B
3. Compute abs(A−B)=C, absolute difference between A and B
4. Compute the average materiality=D, the mean average of the following:
   a. 1% of turnover over the last 12 months
   b. 1% of the total costs over the last 12 months
   c. 2% of Total Assets at end of the most recent month

| % penalty applied | Criteria for application of penalty |
|---|---|
| 51% | (D × 1.1) <= C |
| 21%-51% (scaled) | D <= C < (D × 1.1) |
| 21% | 1 <= C < D |
| 0% | C < 1 | b) Trade Creditors Reconciled

This measure determines whether the balance on the creditors' control account(s) matches the total of the list of trade creditors. It is based on the absolute difference between the total sum of the aged creditors and the closing balances of the creditor control accounts. It has a small tolerance for rounding errors before any penalty is applied. Up to a computed materiality level, a smaller penalty is applied. Over a larger materiality level, the full penalty is applied. Between the two materiality levels, the penalty level is scaled linearly.

1. Compute total sum of aged list(s) of creditors at the end of the most recent month=A
2. Compute total sum of closing balance(s) on the creditors control account(s) at the end of the most recent month=B
3. Compute A−B=C
4. Compute the average materiality=D, the mean average of the following:
   a. 1% of turnover over the last 12 months
   b. 1% of the total costs over the last 12 months
   c. 2% of Total Assets at end of the most recent month

| % penalty applied | Criteria for application of penalty |
|---|---|
| 30% | (D × 1.1) <= C |
| 5%-30% (scaled) | D <= C < (D × 1.1) |
| 5% | 1 <= C < D |
| 0% | C < 1 | c) Trade Debtors Reconciled

This measure determines whether the balance on the debtors' control account(s) matches the total of the list of trade debtors. It is based on the absolute difference between the total sum of the aged debtors and the closing balances of the debtor control accounts. It has a small tolerance for rounding errors before any penalty is applied. Up to a computed materiality level, a smaller penalty is applied. Over a larger materiality level, the full penalty is applied. Between the two materiality levels, the penalty level is scaled linearly.

1. Compute total sum of aged list(s) of debtors at the end of the most recent month=A
2. Compute total sum of closing balance(s) on the debtors control account(s) at the end of the most recent month=B
3. Compute A−B=C
4. Compute the average materiality=D, the mean average of the following:
   a. 1% of turnover over the last 12 months
   b. 1% of the total costs over the last 12 months
   c. 2% of Total Assets at end of the most recent month

| % penalty applied | Criteria for application of penalty |
|---|---|
| 30% | (D × 1.1) <= C |
| 5%-30% (scaled) | D <= C < (D × 1.1) |
| 5% | 1 <= C < D | d) VAT Transactions Reconciled

This measure determines whether the company is using the VAT reconciliation features on the accounting application. It is based on the sum of the absolute values of the unreconciled VAT transactions found in the accounting data, and applies a penalty if this sum exceeds a computed materiality level.

1. Compute total sum of the absolute values of unreconciled VAT transactions with a transaction date earlier than e.g. 4 (a system parameter) months before the end of the most recent month=A
2. Compute the average materiality=D, the mean average of the following:
   a. 1% of turnover over the last 12 months
   b. 1% of the total costs over the last 12 months
   c. 2% of Total Assets at end of the most recent month

| % penalty applied | Criteria for application of penalty |
|---|---|
| 5% | A >= D |
| 0% | A < D | e) Bank Payments Reconciled

This measure determines whether the company is regularly using the Bank reconciliation features on the accounting application. It is based on the sum of the absolute values of the unreconciled Bank payment transactions found in the accounting data, and applies a penalty if this sum exceeds a computed materiality level.

1. Compute total sum of the absolute values of unreconciled bank payments with a transaction date earlier than e.g. 6 (a system parameter) months before the end of the most recent month=A
2. Compute the average materiality=D, the mean average of the following:
   a. 1% of turnover over the last 12 months
   b. 1% of the total costs over the last 12 months
   c. 2% of Total Assets at end of the most recent month

| % penalty applied | Criteria for application of penalty |
|---|---|
| 5% | A >= D |
| 0% | A < D | f) Bank Receipts Reconciled

This measure determines whether the company is regularly using the Bank reconciliation features on the accounting application. It is based on the sum of the absolute values of the unreconciled Bank receipt transactions found in the accounting data, and applies a penalty if this sum exceeds a computed materiality level.

1. Compute total sum of the absolute values of unreconciled bank receipts with a transaction date earlier than e.g. 2 (a system parameter) months before the end of the most recent month=A
2. Compute the average materiality=D, the mean average of the following:
   a. 1% of turnover over the last 12 months
   b. 1% of the total costs over the last 12 months
   c. 2% of Total Assets at end of the most recent month

| % penalty applied | Criteria for application of penalty |
|---|---|
| 5% | A >= D |
| 0% | A < D | g) Wages Posted

This measure determines whether the company is posting wages regularly. The test compares the wages sum in each month against the previous month. If wages have never been posted, the test does not apply. The method compares the ratio of the sum of posted wages transactions from one month to the next. Each month in which the transaction sum drops significantly triggers a penalty, with the most significant penalty given for the most recent month. The overall penalty is the sum of the individual penalties.

1. Compute total sum of transactions on all accounts tagged as 'wages' in a month, t months ago=$A_t$, t=0 ... 11
2. Compute ratios $Rt = A_t / A_{t+1}$

| % penalty applied is the sum of: | Criteria for application of penalty |
|---|---|
| 10.5% | $R_0 < 0.1$ |
| 1/11th of 10.5% | $R_t < 0.1, t = 1 \ldots 11$ | h) Depreciation Provided

This measure determines whether the company is regularly providing for depreciation on tangible assets. It is based on tests that confirm that depreciation is applied in a reasonable manner, given the extent of the company's fixed assets. These test both the total depreciation charges over the last year, and in the most recent month.

1. Compute the average balance of the Net Book Value of Tangible Assets at the end each month over the last 12 months=A
2. Compute the depreciation charge in the most recent month=B
3. Compute the total sum of the depreciation charges in the last 12 months=C

| % penalty applied | Criteria for application of penalty |
|---|---|
| 0% | A =< 1,000 |
| 21% | A > 1,000, C < (A × 2%) |
| 21% | A > 1,000, B = 0 | i) Accruals Provided

This measure determines whether the company is regularly providing for accruals. It is based on the checking the absolute sum of the transactions in accruals accounts found in the accounting data, and applies a penalty if this sum does not exceed a computed materiality level. This test is applied every month in the past year, and a penalty is applied each time it fails—with the largest penalty in the most recent year. The overall penalty is the sum of the individual penalties.

1. Compute the absolute value of transactions on all accounts tagged as 'Accruals' in a month, t months ago=$A_t$, t=0 . . . 11

| % penalty applied is the sum of: | Criteria for application of penalty |
|---|---|
| 5.5% | $A_0 = 0$ |
| 1/11th of 5.5% | $A_t = 0$, t = 1 . . . 11 | j) Accruals Account in Credit

This measure determines whether accounts tagged as accruals close off correctly in credit. It is based on the checking the balance of the accruals accounts found in the accounting data, and applies a penalty if this is found to be in a non-zero debit position. This test is applied every month in the past year, and a penalty is applied each time it fails—with the largest penalty in the most recent year. The overall penalty is the sum of the individual penalties.

1. Compute the sum total balance of any account(s) tagged as 'Accruals' at the end of a month, t months ago=$A_t$, t=0 . . . 11

| % penalty applied is the sum of: | Criteria for application of penalty |
|---|---|
| 5.5% | $A_0$ closed in a non-zero debit position |
| 1/11th of 5.5% | $A_t$ closed in a non-zero debit position, t = 1 . . . 11 | k) Unexpected Transactions—Profit and Loss

This measure determines the extent of unexpected transaction types in the accounts within the Profit and Loss. These are transactions for which the transaction type field value is not one that should appear within the particular profit and loss account in the normal operation of the set of accounts; for instance, a sales account should not contain purchase invoices. The total sum of the absolute values of these transactions is computed, and compared through a simple formula to a materiality level. Above a certain level, the full penalty is applied, below this level the penalty drops linearly to zero.

1. Compute the total sum of the absolute value of all unexpected transactions in the Profit and Loss over last 12 months=A
2. Compute the materiality applicable, =B, to be the larger of:
   a. 1% of all sales
   b. 1% of all costs
3. Compute the formula (A−(50%×B))/B=C

| % penalty applied: | Criteria for application of penalty |
|---|---|
| 21% | 1 < C |
| 0-21% (scaled) | 0 < C <= 1 |
| 0% | C <= 0 | l) Unexpected Transactions—Balance Sheet

This measure determines the extent of unexpected transaction types in the accounts within the Balance Sheet. These are transactions for which the transaction type field value is not one that should appear within the particular balance sheet account in the normal operation of the set of accounts; for instance, a fixed assets account should not contain sales invoices. The total sum of the absolute values of these transactions is computed, and compared through a simple formula to a materiality level. Above a certain level, the full penalty is applied, below this level the penalty drops linearly to zero.

1. Compute the absolute value of unexpected transactions in the Balance Sheet over last 12 months=A
2. Compute the materiality applicable 2% of Total Assets=B
3. Compute the formula (A−(50%×B))/B=C

| % penalty applied: | Criteria for application of penalty |
|---|---|
| 21% | 1 < C |
| 0-21% (scaled) | 0 < C <= 1 |
| 0% | C <= 0 | m) Unexpected Balances—Profit and Loss

This measure determines the extent of income accounts with debit balances and expense accounts with credit balances. The total sum of the absolute values of these balances is computed, and compared through a simple formula against the overall balance sums in the Trial Balance. Above a certain level, the full penalty is applied, below this level the penalty drops linearly to zero.

1. Compute the total sum of all debit closing balances on any income accounts in the Profit and Loss=A
2. Compute the sum of all credit closing balances on any expense accounts in the Profit and Loss=B
3. Compute the sum of all debit closing balances on Trial Balance=C
4. Compute the sum of all credit closing balances on Trial Balance=D
5. Compute the formula (A+B)/(10%×(C+D))=E

| % penalty applied: | Criteria for application of penalty |
|---|---|
| 11% | 1 < E |
| 0%-11% (scaled) | 0 < E <= 1 |
| 0% | E <= 0 | n) Unexpected Balances—Balance Sheet

This measure determines the extent of asset accounts with credit balances and liability accounts with debit balances. The total sum of the absolute values of these balances is computed, and compared through a simple formula against the overall balance sums in the Trial Balance. Above a certain level, the full penalty is applied, below this level the penalty drops linearly to zero.

1. Compute the sum of all debit balances on any liability accounts in the Balance Sheet=A
2. Compute the sum of all credit balances on any asset accounts in the Balance Sheet=B
3. Compute the sum of all debit balances on Trial Balance=C
4. Compute the sum of all credit balances on Trial Balance=D
5. Compute the formula (A+B)/(10%×(C+D))=E

| % penalty applied: | Criteria for application of penalty |
|---|---|
| 11% | 1 < E |
| 0%-11% (scaled) | 0 < E <= 1 |
| 0% | E <= 0 | o) Bookkeeping Timeliness

Assess whether the accounting package is being used in a timely manner, by being kept up-to-date with the latest information. Each transaction in the accounting package has two associated dates: The date at which the transaction is effective, and the date at which the line was posted into the accounting system. The time lag from the first to the second date indicates how long it has taken the bookkeeper to get round to posting the transaction. The method computes the average delay, and inflicts a full penalty if this is over 26 weeks. This is scaled linearly down to zero when the average time delay is two weeks or less.

1. Identify the transaction date of each transaction in the last 12 months=A
2. Identify the posting date of each transaction in the last 12 months=B
3. Compute each individual transaction posting delay, A−B=C (measured in weeks)
4. Compute the average delay D=AVERAGE(C)

| % penalty applied: | Criteria for application of penalty |
| --- | --- |
| 21% | 26 weeks <= D |
| 0%-21% (scaled) | 2 weeks <= C < 26 weeks |
| 0% | C < 2 weeks | p) Stock Variation Adjusted

This measure determines whether the company is keeping its stock account(s) updated with changes in stock balance. The test works by first applying a check to see if the company does indeed have stock. If this test applies, then the absolute sum of transactions in the Stock accounts is checked each month in the past year to determine if stock movements have been properly catered for that month. A penalty applies each month the stock account movements have not been posted, with the largest penalty in the most recent month. The overall penalty is the sum of the individual penalties.

1. Compute the average of closing balances of stock accounts during the last 12 months=A
2. Compute the total Cost of Sales for the last 12 months=B
3. Compute the total absolute sum of transactions in the stock accounts over a month, t months ago $C_t$, t=0 . . . 11

| | Criteria for application of penalty |
| --- | --- |
| % penalty applied: | |
| 0% otherwise, the sum of: | A =< 1,000 OR A =< (2% × B) |
| 5.5% | $C_0 = 0$ |
| 1/11th of 5.5% | $C_t = 0, t = 1 \ldots 11$ |

Using the Account Map

The system extracts the complete financial transaction history, and/or periodic closing balances from the accounting package. Each transaction and periodic balance is associated with one of the mapped accounts.

From the transactions and balances, it is therefore possible to compute a balance figure for any account group at any point in time through the history of the accounts, by accumulating the total value for all accounts in the account group, netting off Credit positions against Debits—in other words, compute a balance figure for any mapped tag in B, C or D by computing the balance figure at that point in time for the account group associated with that tag through the appropriate sub map.

The system can define any of the following in terms of the tags in B, C and D:

Derived financial values consisting of arithmetical formulae of balance figures computed from the tags in B, C and D Example: The Quick Ratio can be defined in terms of the primary category tags "Current Assets" and "Current Liabilities", and the base level tag "Stock", using the arithmetical formula ("Current Assets" less "Stock")/"Current Liabilities".

Financial information tables, such as management accounts defined as layouts of the tags in B, C, and D, and derived financial values. These include:

"Native" layouts, which are user-defined layouts of the financial statements found in the accounts package;

Standardised management account layouts, such as the Profit and Loss and Balance Sheet; and Custom layouts. For example a third party may specify a layout that contains the particular financial information that is of interest to them.

Sharing the Prepared and Validated Financial Data with Third Parties

The system allows the owner of the data to share their financial information with third parties. The custom layouts allow the third parties to define the format in which they would like to receive this data. This means that they can receive standardised normalised financial data, independent of the original source format.

Once the accounting data has been mapped and assessed for quality, the system is able to share these financial data reports with third parties. The sharing is achieved through a user interface. The system shows the end user who owns the financial data with a secure web-based interface which presents a list of the third parties with whom validated and summarised financial data can be shared.

By clicking a button next to the name of a third party on the list, the end user will authorise the system to share the latest set of financial data with that third party. The third party will then receive a copy of that financial data by transmission through an electronic medium such as email or a web interface. The financial data will be prepared and presented in the format desired by the third party, and will include the quality score associated with the data set.

Embodiments of the invention have been described with particular reference to the example illustrated. However, it will be appreciated that variations and modifications may be made to the examples described within the scope of the invention.

The invention claimed is:

1. A method of analyzing financial accounting data, the method comprising:

receiving at a server the financial accounting data from a client accounting system, the financial accounting data including transaction data arranged in accordance with a chart of accounts structure, wherein the chart of accounts structure can take different forms depending on the arrangement of the client accounting system, the chart of accounts structure including a set of accounts A organized into account groups G and the transaction data including transactions posted to the accounts A;

mapping, by an account mapping engine executed by a processor of the server, the financial accounting data to one or more accounting ontologies stored at the server, each ontology representing a standardized set of accounts comprising at least:
  a pre-defined set of primary category tags C representing account groupings of the accounting ontology;
  a pre-defined set of base level tags B representing accounts characteristics of the accounting ontology, wherein each base level tag B of the pre-defined set of base level tags B is associated with one or more criteria K comprising:
    i) an association with a primary category tag C of the pre-defined set of primary category tags C, and
    ii) rules characterizing an account type by any one or more of: information identifying a name of the account, expected transactions of the account, and an expected balances of the account; and,
  a pre-defined set of dynamic tags D representing combinations of tags B of the pre-defined set of base level tags B, tags C of the pre-defined set of primary category tags C, and other dynamic tags D, the combinations using set arithmetic operations including anyone or more of union, intersection, and complement operations;
wherein the step of mapping comprises:
  mapping the account groups G in the accounting data to primary category tags C of the pre-defined set of primary category tags C in the accounting ontology and then creating a submap from the accounts A in each account group G of the account groups G to the mapped primary category tag C;
  creating a submap from the accounts A in the accounting data to the base level tags B in the accounting ontology by:
    for each of the base level tags B in turn, identifying in the accounts A unmatched accounts A;
    for each of the unmatched accounts A in turn, evaluating the unmatched account A against the criteria K for the base level tag B, including matching the primary category tag C associated with the base level tag B in the criteria K against the primary category tag C to which the account A is mapped in the submap from the accounts A to primary category tags C, and applying the rules for the base level tag B to the unmatched account A; and
  if the criteria match, mapping the account A to the base level tag B and excluding the mapped account A from consideration for matching of subsequent accounts A; and,
  creating a submap from the accounts A to the dynamic tags D of the pre-defined set of dynamic tags D by applying for each of the dynamic tags D said set arithmetic operators to the accounts A already mapped to the combination of the primary category tags C of the pre-defined set of primary category tags C, the base tags B of the pre-defined set of base level tags B, or other dynamic tags D represented by the dynamic tag D,
  such that each account A and said transactions posted to that account A are mapped to a base tag B, one or more primary category tags C, and optionally one or more dynamic tags D thereby being mapped to the accounting ontology; and
analyzing the mapped transaction data, by an analysis engine executed by the processor of the server, wherein analyzing further comprises:
  evaluating the transaction data at the server against a plurality of tests for bookkeeping and accounting problems and building a representative score based on the test results; and
  compiling normalized management accounts including balance figures for any tag B, C, D of the pre-defined set of base level tags B, of the pre-defined set of primary category tags C, and of the dynamic tags D, respectively, at any point in time, where the balance figure is calculated for the transaction data posted to the accounts A and mapped to those tags B, C, D; and
communicating the results of the analysis to a user.

2. The method according to claim 1, wherein the primary category tags C represent account groups that include fixed assets, current assets, current liabilities, long term liabilities, capital and reserves, sales, cost of sales, other income and expenditure, and any other category held in the accounting system.

3. The method according to claim 1, the step of mapping account groups comprising:
  if the accounting package already groups accounts A into fixed account groups G that are directly equivalent to the primary category tags C, then the method proceeds by mapping the accounts A in those account groups G directly to the equivalent primary category tags C.

4. The method according to claim 1, wherein in the accounting ontology each primary level tag C is associated with a range of account numbers range(c), and in the accounting data each account group G has an associated user-defined account number range range(g),
  wherein the step of mapping account groups comprises, for each account group G in turn:
    comparing the account number range of the primary level tags range(c) against the account number range of the account group range (g) to determine the level of intersection; and,
    if the level of intersection exceeds a predetermined threshold, mapping the account group G to the primary level tag C.

5. The method according to claim 1, wherein in the accounting data the account groups are arranged in a tree-like hierarchy including a plurality of nodes, wherein each node in the tree represents an account group G comprising one or more of the accounts A, and is a subset of an account group G represented by a parent node, the step of mapping account groups comprising:
  arranging the account groups G in the tree in a depth first order;
  identifying an accounting standard for the accounts A based on the accounting data and arranging the primary category tags C in the order in which the accounts A appear according to that standard, each primary category tag C being associated in the accounting ontology with a set of one or more possible names for an account group G; and,
  for each account group G in the tree in order, attempting to fuzzy match a name of the account group G with said one or more possible names of the primary category tags C taken in order; and,
  where a match is found, mapping the account group G to the primary category tag C.

6. The method according to claim 1, wherein:
  said information identifying the name of the account includes expected text terms to fuzzy match against the account name;
  said expected transactions of the account includes the expected percentage of debit and credit transactions in the account over a given time period and the expected sign of the sum of all transactions in the account over a given time period; and, the expected balances of the account includes the balances at the end of a given time period.

7. The method according to claim 1, wherein the criteria K include an additional catch all matching rule which matches any remaining unmapped account A of the accounts A to a default base level tag B of the pre-defined set of base level tags B after all other criteria have been applied to ensure that all accounts become mapped.

8. The method according to claim 1, comprising giving the accounts an initial perfect score and then applying a penalty to the score for each of the plurality of tests that is failed.

9. The method according to claim 8, wherein the plurality of tests comprise different types of tests, tests having a level of materiality, and tests that can be failed to different degrees, wherein the penalty depends on at least one of:
the type of test being applied;
the level of materiality of the test; and,
the degree to which the test is failed.

10. The method according to claim 9, wherein any one or more of the following tests are used:
k) an error is a total sum of absolute values of all unexpected transactions in profit and loss categories over a preceding n months, where n is a predefined system parameter, and the materiality is a function of all sales or costs;
l) the error is a total sum of absolute values of all unexpected transactions in a balance sheet over the preceding n months, where n is a predefined system parameter, and the materiality is a function of total assets;
m) the error is a total sum of all debit closing balances on any income accounts in the profit and loss categories and a sum of all credit closing balances on any expense accounts in the profit and loss categories, and the materiality is a function of a sum of all debit closing balances on trial balance and a sum of all credit closing balances on trial balance;
n) the error is a total sum of all debit balances on any liability accounts in the balance sheet and a sum of all credit balances on any asset accounts in the balance sheet, and the materiality is a function of a sum of all debit closing balances on trial balance and a sum of all credit closing balances on trial balance; and,
o) the error is an average delay in posting transactions to the accounting package.

11. The method according to claim 8, wherein at least one test comprises finding an error value as a function of transactions or balances posted to the accounts in the financial accounting information;
finding a first materiality score as a function of transactions or balances posted to the accounts in the financial accounting information under which a minimum penalty is imposed;
finding a second materiality score as a function of transactions or balances posted to the accounts in the financial accounting information over which a maximum penalty is imposed;
between the first and second materiality scores, scaling the penalty between a minimum and a maximum score.

12. The method according to claim 11, wherein if the error value is below a threshold amount, no penalty is imposed.

13. The method according to claim 11, wherein the second materiality score is a function of the first materiality score.

14. The method according to claim 11, wherein the error value is any one or more of:
a) an absolute difference between a total sum of debit balances on a trial balance at an end of a most recent month and a total sum of credit balances on the trial balance at the end of the most recent month;
b) a difference between a total sum of an aged list or lists of creditors and a total sum of closing balance or balances on a control account or accounts of the creditors;
c) a difference between a total sum of an aged list or lists of debtors and a total sum of closing balance or balances on a control account or accounts of the debtors;
d) a total sum of absolute values of unreconciled VAT transactions with a transaction date earlier than n months before the end of the most recent month, where n is a predefined system parameter;
e) a total sum of absolute values of unreconciled bank payments with a transaction date earlier than p months before the end of the most recent month, where p is a predefined system parameter;
f) a total sum of absolute values of unreconciled bank receipts with a transaction date earlier than q months before the most recent month, where q is a predefined system parameter;
g) a ratio of a sum of transactions on all accounts tagged as wages in a month compared to that of the following month;
i) an absolute value of transactions of all accounts tagged as accruals in a month;
j) a sum total balance of any account or accounts tagged as accruals at the end of a month; and,
p) a total absolute sum of transactions in stock accounts over a month.

15. The method according to claim 14, wherein the first materiality is a function of turnover or total costs over a recent period, or total assets at a recent point of time.

16. The method according to claim 8, wherein at least one test comprises:
if an average balance of a net book value of tangible assets at an end of each month over a preceding n months does not exceed a fixed value, then the penalty is determined to be zero, otherwise the penalty is determined to be a fixed non-zero value, by testing if i) a depreciation charge in the most recent month is zero; or if ii) a total sum of the depreciation charges in the preceding n months is less than a fixed percentage of the average balance of the net book value of tangible assets at the end of each month over the last n months.

17. The method according to claim 8, comprising providing the score to an interested third party, comprising one or more of credit industry, regulatory, and government bodies.

18. The method according to claim 1, comprising categorizing a quality of the accounts A, each category having a high and low threshold applied to the representative score.

19. The method according to claim 1, wherein at least one test comprises finding an error value as a function of transactions or balances posted to the accounts in the financial accounting information for each of plural months culminating with the most recent month, wherein the test score is a sum of penalties applied to each month and wherein the highest penalty is for the most recent month.

20. The method according to claim 1, in which the user can authorize the results of the analysis to be shared with an interested third party comprising one or more of credit industry, regulatory, and government bodies.

21. A system, comprising:
a server configured to receive financial accounting data from a client accounting system, the financial accounting data including transaction data arranged in accordance with a chart of accounts structure, wherein the chart of accounts structure can take different forms depending on the arrangement of the client accounting system, the chart of accounts structure including a set of accounts A organized into account groups G and the transaction data including transactions posted to the accounts A;
the server further comprising a processor configured to execute an account mapping engine to map the financial accounting data to one or more accounting ontologies stored at the server, each ontology representing a standardized set of accounts comprising at least:
a pre-defined set of primary category tags C representing account groupings of the accounting ontology;
a pre-defined set of base level tags B representing accounts characteristics of the accounting ontology, wherein each base level tag B of the pre-defined set of base level tags B is associated with one or more criteria K comprising:
i) an association with a primary category tag C of the pre-defined set of primary category tags C, and
ii) rules characterizing an account type by any one or more of: information identifying a name of the account, expected transactions of the account, and an expected balances of the account; and,
a pre-defined set of dynamic tags D representing combinations of tags B of the pre-defined set of base level tags B, tags C of the pre-defined set of primary category tags C, and other dynamic tags D, the combinations using set arithmetic operations including anyone or more of union, intersection, and complement operations;
wherein when the account mapping engine maps the financial accounting data, the account mapping engine is further configured to:
map the account groups G in the accounting data to primary category tags C of the pre-defined set of primary category tags C in the accounting ontology and then create a submap from the accounts A in each account group G of the account groups G to the mapped primary category tag C;
create a submap from the accounts A in the accounting data to the base level tags B in the accounting ontology, wherein the account mapping engine is configured to:
identify, for each of the base level tags B in turn, in the accounts A unmatched accounts A;
evaluate, for each of the unmatched accounts A in turn, the unmatched account A against the criteria K for the base level tag B, including matching the primary category tag C associated with the base level tag B in the criteria K against the primary category tag C to which the account A is mapped in the submap from the accounts A to primary category tags C, and apply the rules for the base level tag B to the unmatched account A; and
if the criteria match, map the account A to the base level tag B and exclude the mapped account A from consideration for matching of subsequent accounts A; and,
create a submap from the accounts A to the dynamic tags D of the pre-defined set of dynamic tags D by applying for each of the dynamic tags D said set arithmetic operators to the accounts A already mapped to the combination of the primary category tags C of the pre-defined set of primary category tags C, the base tags B of the pre-defined set of base level tags B, or other dynamic tags D represented by the dynamic tag D,
such that each account A and said transactions posted to that account A are mapped to a base tag B, one or more primary category tags C, and optionally one or more dynamic tags D thereby being mapped to the accounting ontology; and
the processor further configured to execute an analysis engine configured to analyze the mapped transaction data, wherein the analysis engine is further configured to:
evaluate the transaction data at the server against a plurality of tests for bookkeeping and accounting problems and build a representative score based on the test results; and
compile normalized management accounts including balance figures for any tag B, C, D of the pre-defined set of base level tags B, of the pre-defined set of primary category tags C, and of the dynamic tags D, respectively, at any point in time, where the balance figure is calculated for the transaction data posted to the accounts A and mapped to those tags B, C, D; and communicate the results of the analysis to a user.

22. A non-transitory computer-readable medium containing instructions that, when executed by a processor, cause the processor to:
receive financial accounting data from a client accounting system, the financial accounting data including transaction data arranged in accordance with a chart of accounts structure, wherein the chart of accounts structure can take different forms depending on the arrangement of the client accounting system, the chart of accounts structure including a set of accounts A organized into account groups G and the transaction data including transactions posted to the accounts A;
execute an account mapping engine to map the financial accounting data to one or more accounting ontologies stored at the server, each ontology representing a standardized set of accounts comprising at least:
a pre-defined set of primary category tags C representing account groupings of the accounting ontology;
a pre-defined set of base level tags B representing accounts characteristics of the accounting ontology, wherein each base level tag B of the pre-defined set of base level tags B is associated with one or more criteria K comprising:
i) an association with a primary category tag C of the pre-defined set of primary category tags C, and
ii) rules characterizing an account type by any one or more of: information identifying a name of the account, expected transactions of the account, and an expected balances of the account; and,
a pre-defined set of dynamic tags D representing combinations of tags B of the pre-defined set of base level tags B, tags C of the pre-defined set of primary category tags C, and other dynamic tags D, the combinations using set arithmetic operations including anyone or more of union, intersection, and complement operations;
wherein when the account mapping engine maps the financial accounting data, the account mapping engine is further configured to:

map the account groups G in the accounting data to primary category tags C of the pre-defined set of primary category tags C in the accounting ontology and then create a submap from the accounts A in each account group G of the account groups G to the mapped primary category tag C;

create a submap from the accounts A in the accounting data to the base level tags B in the accounting ontology, wherein the account mapping engine is configured to:

identify, for each of the base level tags B in turn, in the accounts A unmatched accounts A;

evaluate, for each of the unmatched accounts A in turn, the unmatched account A against the criteria K for the base level tag B, including matching the primary category tag C associated with the base level tag B in the criteria K against the primary category tag C to which the account A is mapped in the submap from the accounts A to primary category tags C, and apply the rules for the base level tag B to the unmatched account A; and if the criteria match, map the account A to the base level tag B and exclude the mapped account A from consideration for matching of subsequent accounts A; and, create a submap from the accounts A to the dynamic tags D of the pre-defined set of dynamic tags D by applying for each of the dynamic tags D said set arithmetic operators to the accounts A already mapped to the combination of the primary category tags C of the pre-defined set of primary category tags C, the base tags B of the pre-defined set of base level tags B, or other dynamic tags D represented by the dynamic tag D, such that each account A and said transactions posted to that account A are mapped to a base tag B, one or more primary category tags C, and optionally one or more dynamic tags D thereby being mapped to the accounting ontology; and execute an analysis engine configured to analyze the mapped transaction data, wherein the analysis engine is further configured to:

evaluate the transaction data at the server against a plurality of tests for bookkeeping and accounting problems and build a representative score based on the test results; and compile normalized management accounts including balance figures for any tag B, C, D of the pre-defined set of base level tags B, of the pre-defined set of primary category tags C, and of the dynamic tags D, respectively, at any point in time, where the balance figure is calculated for the transaction data posted to the accounts A and mapped to those tags B, C, D; and communicate the results of the analysis to a user.

\* \* \* \* \*